United States Patent [19]

Steffen et al.

[11] Patent Number: 5,533,590
[45] Date of Patent: Jul. 9, 1996

[54] STEERING SWITCH INTEGRAL WITH AN IMPLEMENT CONTROL LEVEL

[75] Inventors: Mark A. Steffen, Goodfield; Lynn A. Sutton, Kewanee, both of Ill.; Gregory K. Stuckey, Knightdale, N.C.; Rex N. Johnsen, Princeton, Ill.

[73] Assignee: Caterpillar Inc., Peoria, Ill.

[21] Appl. No.: 405,568

[22] Filed: Mar. 16, 1995

Related U.S. Application Data

[63] Continuation of Ser. No. 100,782, Aug. 2, 1993, abandoned.
[51] Int. Cl.⁶ ........................................... B62D 1/14
[52] U.S. Cl. .................... 180/332; 74/471 XY; 74/523
[58] Field of Search ....................... 180/332; 74/471 XY, 74/523

[56] References Cited

U.S. PATENT DOCUMENTS

| | | | |
|---|---|---|---|
| 3,275,093 | 9/1966 | Pawl | 180/332 |
| 4,140,200 | 2/1979 | Tacek | 180/332 X |
| 4,158,968 | 6/1979 | Wilson et al. | 180/332 |
| 4,216,467 | 8/1980 | Colston | 74/471 XY |
| 4,398,616 | 8/1983 | Braden et al. | 180/140 |
| 4,574,651 | 3/1986 | Nordstrom | 74/471 XY |
| 4,726,442 | 2/1988 | Hansen | 180/332 |
| 4,917,204 | 4/1990 | Andrew et al. | 180/140 |
| 5,042,314 | 8/1991 | Rytter et al. | 74/523 |
| 5,111,901 | 5/1992 | Bachhuber et al. | 180/140 |
| 5,139,105 | 8/1992 | Frost et al. | 180/140 |
| 5,261,291 | 11/1993 | Schoch et al. | 74/523 |

FOREIGN PATENT DOCUMENTS

| | | | |
|---|---|---|---|
| 1661037 | 7/1991 | U.S.S.R. | 180/332 |
| 0630516 | 10/1949 | United Kingdom | 180/332 |
| 8401134 | 3/1984 | WIPO | 180/332 |

*Primary Examiner*—Christopher P. Ellis
*Attorney, Agent, or Firm*—Claude F. White

[57] ABSTRACT

All wheel steer work vehicles are useful for working in conditions which require greater maneuverability and traction. When simultaneous work operations and steering is required, a control having both functions is required. The subject vehicle includes a steering wheel for steering a first pair of wheels, an implement lever for controlling the implement work functions, and a switch means for steering a second pair of wheels mounted on the implement lever. This arrangement of components provides simultaneous movement of a work mechanism and steering of the second pair of wheels using only one hand of an operator.

4 Claims, 2 Drawing Sheets

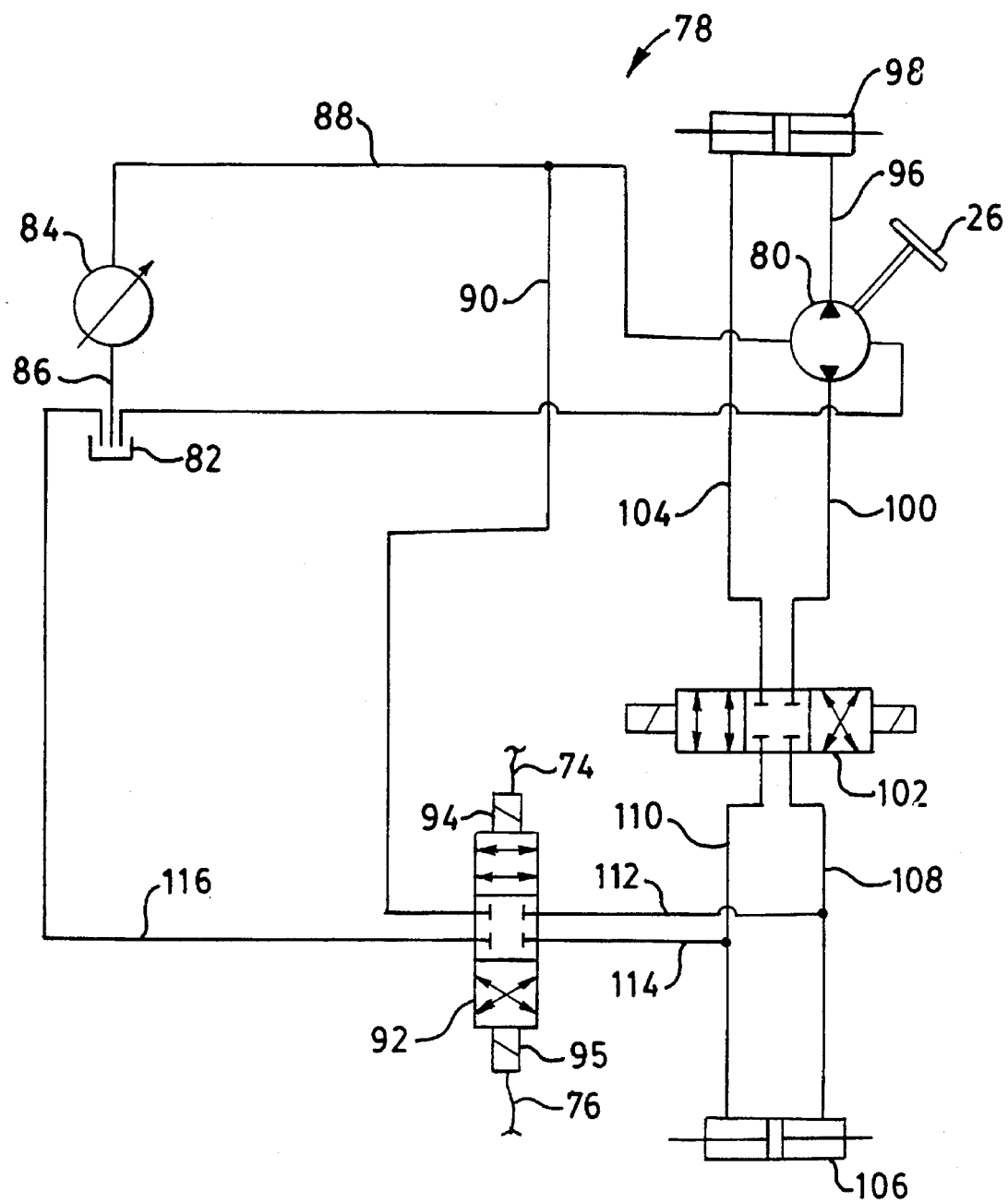

STEERING SWITCH INTEGRAL WITH AN IMPLEMENT CONTROL LEVEL

This is a continuation of U.S. patent application Ser. No. 08/100782, filed Aug. 2, 1993, now abandoned.

TECHNICAL FIELD

This invention relates to a control arrangement for an all wheel steer loader and more particularly to an implement function control lever having an integral switch which can be actuated to steer the rear wheels, independent of the front wheels, while moving the control lever.

BACKGROUND ART

Loaders are commonly used to load material in confined areas and poor underfoot conditions wherein the loader must be easily maneuvered and controlled. To improve maneuverability, loaders having all wheel steer capability were developed. The rear wheels could be steered independently of the front wheels or simultaneously with the front wheels. One example of such use has a steering wheel to steer the front wheels and a separate control box and system to steer the rear wheels. A toggle switch was mounted within the control box. One of the problems associated with such a system is that the separate control box was mounted on the console. With the operator using one hand to turn the steering wheel and the other hand to move the toggle switch no other functions, such as loading, could be performed. If the operator wished to perform any loading functions he had to release one of the steering controls and move his hand to the loading function control lever. These functions could not be performed simultaneously.

The present invention is directed to overcoming the problem as set forth above.

DISCLOSURE OF THE INVENTION

In one aspect of the present invention, a control arrangement is adapted for use on a vehicle having a pair of front steerable wheels, a pair of rear steerable wheels and an implement carried on the vehicle. Means is provided for steering the front wheels. Means is provided for controlling the implement, the means includes a lever. Means is provided for steering the rear wheels, the means includes an actuator mounted on the lever.

The present invention provides a control arrangement for a vehicle which mounts the means for steering the rear wheels of the vehicle on the implement control lever. With this arrangement one hand steers the front wheels while the other hand simultaneously performs the implement functions and steers the rear wheels.

BRIEF DESCRIPTION OF THE DRAWINGS

FIG. 3, is a diagrammatic view of a hydraulic steering circuit.

BEST MODE FOR CARRYING OUT THE INVENTION

Figure 1:
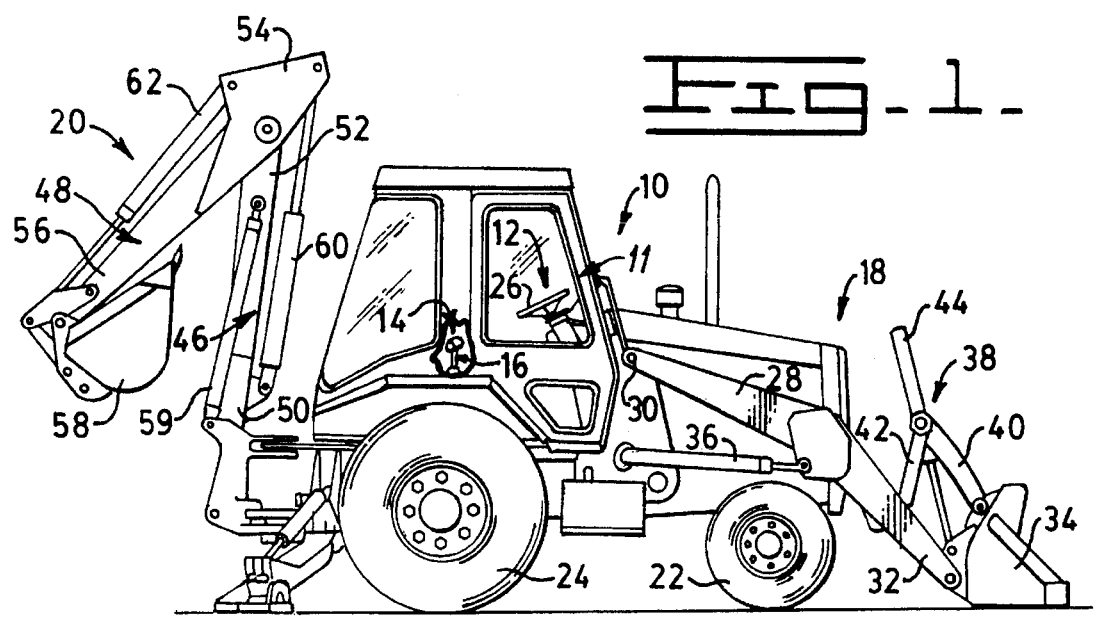
FIG. 1, is a side view of a vehicle showing the present invention.

Referring to FIG. 1, a vehicle 10, such as a backhoe loader, includes a control arrangement 11 having a conventional first steering means 12 and a second steering means 14 including a switch means 15 (FIG. 2) which is integral with an implement control 16. The implement control 16 includes a lever 17 which controls the work functions of a work mechanism, such as a loading mechanism 18.

The vehicle 10 includes the loading mechanism 18 attached to the front of the vehicle 10 and a backhoe mechanism 20 attached to the rear of the vehicle 10. The vehicle 10 has a first pair of steerable wheels 22, shown as front wheels, and a second pair of steerable wheels 24, shown as rear wheels. The first steering means 12 includes a steering wheel 26 rotatable to steer the wheels 22, in a conventional manner.

The loading mechanism 18 includes a lift arm 28 having a first end 30 pivotally connected to the vehicle 10 and a second end 32 extending therefrom forwardly in front of the vehicle 10. A bucket 34 is pivotally attached to the second end 32 of the lift arm 28. A hydraulic cylinder 36 is attached between the vehicle 10 and the lift arm 28 to pivotally move the lift arm 28. A tilt mechanism 38 is connected between the bucket 34 and the lift arm 28. The tilt mechanism 38 includes a first link 40 connected to the bucket 34, a second link 42 connected to the lift arm 28 and a hydraulic cylinder 44 connected between the bucket 34 and the first and second links 40,42. The lever 16 can be rotated as shown by line A to control the hydraulic cylinder 36. The lever 16 can also be rotated as shown by line B to control the hydraulic cylinder 44.

The backhoe mechanism 20 includes a boom assembly 46 and a stick assembly 48. The boom assembly 46 has a first end 50 pivotally attached to the vehicle 10 and a second end portion 52 extending therefrom. The stick assembly 48 has a first end portion 54 pivotally attached to the second end portion 52 of the boom assembly 46 and a second end portion 56 extending therefrom. A bucket 58 is pivotally attached to the second end portion 56 of the stick assembly 48. A hydraulic cylinder 59 is connected between the vehicle 10 and the boom 46. A hydraulic cylinder 60 is connected between the boom assembly 46 and the first end portion 54 of the stick assembly 48. A hydraulic cylinder 62 is connected between the first end portion of the stick assembly 48 and the bucket 58.

Figure 2:
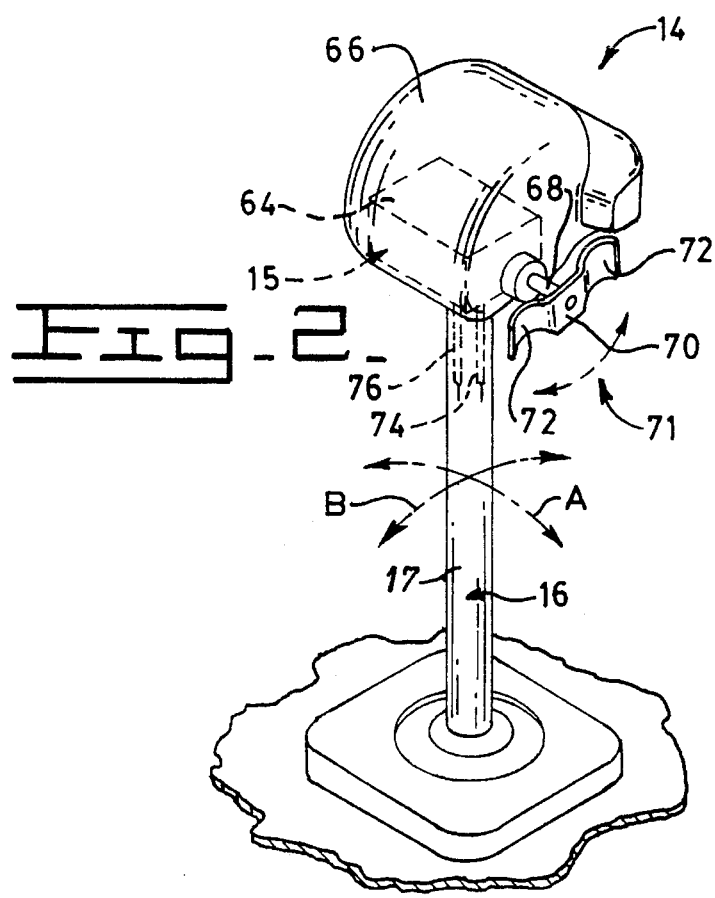
FIG. 2, is an isometric view of the present invention showing the movement of the lever.

As best shown in FIG. 2, the second steering means 14 includes the switch means 15. The switch means 15 is shown as a toggle switch 64; however, the switch means can be a rotary switch or any other suitable means. The toggle switch can be positioned within a knob 66 on the implement control lever 16. The knob 66 provides a rest for the operator's hand, not shown, when operating the control lever 16. The toggle switch has a stem 68 extending from the knob 66. The stem 68 includes a control plate 70 extending perpendicularly to the stem 68. The stem 68 and the plate 70 form an actuating means 71 to control the toggle switch 64. The control plate 70 includes a pair of notches 72 for receiving the operator's hand. The toggle switch 64 has a wire 74 to control right steer and a wire 76 to control left steer.

Now referring to FIG. 3, a hydraulic circuit 78, is shown for steering the wheels 22 and the wheels 24 of the vehicle 10. The steering wheel 26 actuates a hand metering unit 80 to steer the vehicle 10. Circuit 78 includes tank 82 serving as a source of hydraulic fluid. A pump 84 draws the hydraulic fluid through a line 86 from the tank 82. The discharge side of the pump 84 is connected to a line 88 which provides fluid to the hand metering unit 80 and a line 90. The line 90 provides fluid to a rear steer valve 92. The rear steer valve 92 has a first solenoid 94 connected to the wire 74 and a second solenoid 95 connected to the wire 76.

The hand metering unit 80 provides fluid to a line 96 for a front steer cylinder 98 or to a line 100 for a selector valve 102. The selector valve 102 provides fluid to the front steer cylinder 98 through line 104. The selector valve 102 also provides fluid to a rear steer cylinder 106 through a line 108 or a line 110. A line 112 provides fluid from the rear steer valve 92 to the line 108. A line 114 provides fluid from the rear steer valve 92 to the line 110. A line 116 connects the rear steer valve 92 to the tank 82.

INDUSTRIAL APPLICABILITY

In use of the present invention, the operator steers the first pair of wheels 22 by rotating the steering wheel 26 to actuate the hand metering unit 80. When in the front wheel steer mode, the selector valve 102 is in the centered position allowing fluid to flow between the hand metering unit 80 and the front steer cylinder 98. When the steering wheel 26 is rotated clockwise, fluid flows through the line 96 to one end of the front steer cylinder 98, forcing fluid out the other end of front steer cylinder 98. Exiting fluid flows through line 104, selector valve 102 and line 100, returning to the hand metering unit 80. When the steering wheel 26 is rotated counterclockwise, the flow of fluid is reversed.

When the system is in the independent steer mode, the wheels 22 are steered the same as when in the front wheel steer mode, as described above. The second pair of wheels 24 are steered by movement of the toggle switch 64 positioned within the knob 66. The implement lever 16 functions in a conventional manner to control the loading mechanism 28 of the vehicle 10. When rear steering is required, the operator moves the toggle switch 64, sending an electrical signal through one of the wires 74,76 to shift the rear steer valve 92. For example, in a rear right steer the solenoid 94 is actuated to shift the valve 92 allowing fluid to flow through the line 112 into one end of the rear steer cylinder 106 forcing fluid out the other end of the rear steer cylinder 106. Exiting fluid flows through line 114, rear steer valve 92 and line 116 to tank 82. When the toggle switch 64 is moved leftwardly, the solenoid 95 is actuated and the rear steer valve 92 allows fluid to flow through the line 114 into the other end of the rear steer cylinder 106.

In view of the foregoing, it is readily apparent the structure of the present invention provides a steering arrangement wherein the rear steer switch is integral with the loading control lever. This arrangement allows the operator to use one hand to rotate a steering wheel in a conventional manner to steer a first pair of wheels, and use the other hand to operate the implement lever for simultaneous movement of the work mechanism of the vehicle and also use the switch means for steering the second pair of wheels. Mounting the switch means on the implement lever will allow the vehicle to be easily maneuvered and controlled to operate the work functions and also steer the vehicle while controlling the work mechanism.

Other aspects, objects and advantages of this invention can be obtained from a study of the drawing, the disclosure and the appended claims.

We claim:

1. A control arrangement for a vehicle having a primary pair of steerable wheels, a secondary pair of steerable wheels, and a work implement connected to said vehicle, said control arrangement comprising:

first means for controllably steering said primary pair of steerable wheels, said first means including a steering wheel;

second means for controllably changing the angle of orientation of said secondary pair of steerable wheels independently of and simultaneously with the steering of said primary pair of steerable wheels, said second means being remotely positioned from said first steering means; and an implement control lever for controlling the movement of said work implement, said second means being associated with said implement control lever.

2. A control arrangement, as set forth in claim 1, wherein said second means includes a toggle switch and said control lever includes a control knob, said toggle switch being contained within said control knob and having an actuating means which extends outwardly of said control knob.

3. A control arrangement, as set forth in claim 1, wherein said work implement includes a bucket, said implement control lever being adapted to manipulate said bucket independently of and simultaneously with said second means.

4. A wheel-type work machine having front and rear portions, a primary pair of front steerable wheels, a secondary pair of rear steerable wheels, and a work implement connected to said front machine portion, the improvement comprising:

first control means for controllably steering the primary pair of front steerable wheels, said first control means including a steering wheel;

second control means for controllably changing the angle of orientation of said secondary pair of wheels independently of and simultaneously with the steering of said primary pair of steering wheels and for positioning said rear machine portion relative to said front machine portion; and an implement control lever for controlling the movement of said work implement, said implement control lever being remotely positioned from said first control means, and said second control means being directly associated with said implement control lever.

* * * * *